United States Patent [19]

Cornelson

[11] 4,359,967
[45] Nov. 23, 1982

[54] FARROWING HOUSE

[76] Inventor: Stanley L. Cornelson, Rte. 3, Wellington, Kans. 67152

[21] Appl. No.: 155,519

[22] Filed: Jun. 20, 1980

[51] Int. Cl.³ .............................................. A01K 1/00
[52] U.S. Cl. ........................................ 119/16; 119/20
[58] Field of Search ............................. 119/16, 19, 20

[56] References Cited

U.S. PATENT DOCUMENTS

| 1,457,636 | 6/1923 | Shrauger | 119/16 |
| 2,602,419 | 7/1952 | Johnson | 119/16 |
| 3,106,188 | 10/1963 | McMurray | 119/16 X |
| 3,129,693 | 4/1964 | De Vore | 119/16 |
| 3,216,396 | 11/1965 | Scamman | 119/20 |

FOREIGN PATENT DOCUMENTS 640715  1/1979  U.S.S.R. ............................. 119/20

*Primary Examiner*—G. E. McNeill
*Assistant Examiner*—Robert P. Swiatek
*Attorney, Agent, or Firm*—John H. Widdowson

[57] ABSTRACT

A farrowing house for a sow, a method of fabricating an animal shelter, and a mold for casting a reinforced concrete animal shelter. The house or shelter includes a crib structure defining two sets of spaced rails having at least one set pivotally connected to the end walls. The method of fabricating the animal shelter includes the steps of constructing an inner mold and an outer mold, placing an inner reinforcing cage between the two molds, and pouring a concrete substance between the two molds and around the cage. The mold comprises an inner shell and an outer shell having external stiffening rods to preclude outward buckling.

2 Claims, 8 Drawing Figures

FARROWING HOUSE

BACKGROUND OF THE INVENTION

1. Field of the Invention

This invention is related to a farrowing house. More specifically, this invention provides for a farrowing house, a method of fabricating an animal shelter, and a mold for casting a reinforced concrete animal shelter.

2. Description of the Prior Art

U.S. Pat. No. 2,782,758 by Turner discloses a portable concrete farrowing house formed as a single unit. U.S. Pat. No. 2,740,379 by Collins teaches a farrowing pen in which the sow can only lie in one position therein and in which position the body of the sow is disposed so that the litter of baby pigs may readily nurse. U.S. Pat. No. 3,172,392 by Schultz teaches a circular portable precasted farrowing house, and U.S. Pat. No. 2,460,662 by Van Voorhis discloses a building construction. None of the foregoing prior art teaches the novel farrowing house, the method of fabricating an animal shelter, or the mold for casting the animal shelter, all of which are the subject invention.

SUMMARY OF THE INVENTION

It is therefore an object of this invention to provide a farrowing house for an expectant sow, a method fabricating an animal shelter, and a mold for casting a reinforced concrete animal shelter.

It is another object of this invention to provide a portable farrowing house constructed of lightweight concrete, and relatively economical to manufacture.

The foregoing objects are accomplished by this invention. Broadly, this invention is a farrowing house for an expectant sow comprising an enclosure having two side walls, two end walls having a structure defining a plurality of rail pivot apertures, and a roof. The side walls essentially define a truncated "A" in cross section. One end wall has an opening to grade and the other end wall has an opening above grade for ventilation. A crib structure within the enclosure defines two sets of special rails having at least one set pivotally connected to the end walls. The sets of rails are spaced upwardly from the grade and form a means for restricting movement of the sow to the central portion of the enclosure and to the grade opening. Each set of rails cooperate with the mating side walls to provide an access area for farrows but preclude access to the sow whereby the farrows are free to nurse and the sow is prevented from lying inadvertently upon the farrows. The method of fabricating an animal shelter includes the steps of constructing an inner mold shell having opposed side walls, opposed end walls and a top wall. The shell defines a truncated "A" in cross section. A cage of metal reinforcing rod is constructed and is of the same general configuration as the inner shell. The cage is dimensioned so that the rod is spaced from the external surface of the inner shell. The cage is placed over the inner shell. An outer shell is fabricated with an open top of the same general configuration of the inner shell. The outer shell is dimensioned so that it is operable to receive the inner shell and the cage in telescopic relation with the inner surface of the outer shell spaced from the external surface of the inner shell and with the cage occupying the space between both shells. The outer shell is placed over the cage and concrete is subsequently introduced into the space between both shells effective to mold a metal reinforced concrete shelter.

The mold for casting a reinforced concrete animal shelter includes a first and a second shell, each including opposed side walls, opposed end walls and each defining a truncated "A" in cross section. The first shell defines an inner mold having a top wall. The second shell has an open top dimensioned and operable to receive the first shell so that an air gap exists between the shells; the air gap defines the wall thickness of the shelter.

DETAILED DESCRIPTION OF THE INVENTION

Figure 1:
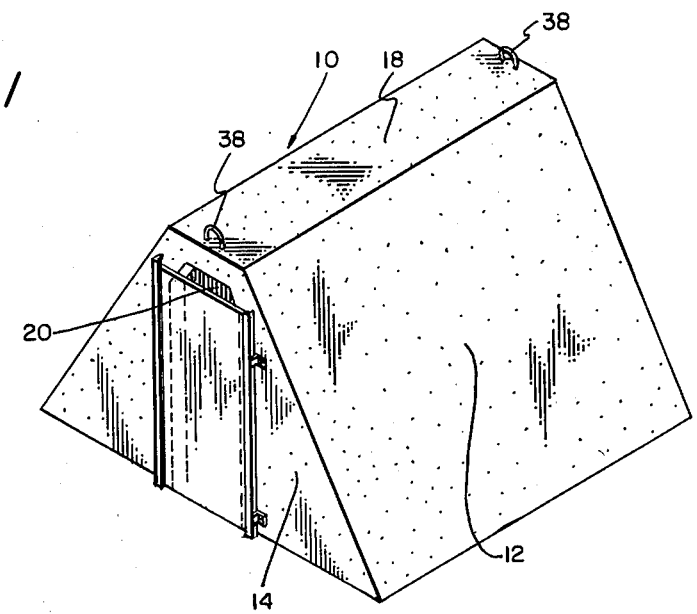
FIG. 1 is a perspective view of the farrowing house.
Figure 2:
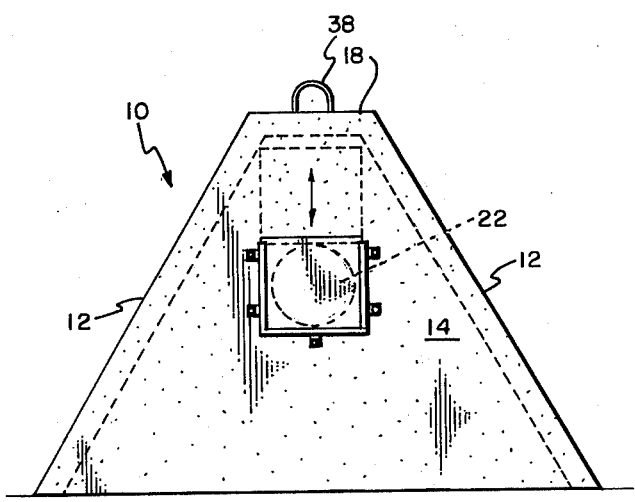
FIG. 2 is a rear elevational view of the farrowing house disclosing the ventilation opening having a slidable door.
Figure 3:
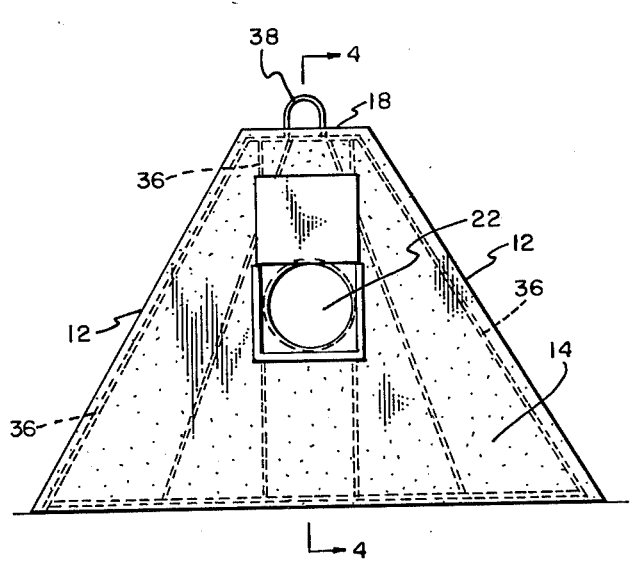
FIG. 3 is a rear elevational view of the farrowing house disclosing the ventilation opening and the reinforcement cage as dotted lines.

Referring in detail now to the drawings, wherein like reference numerals designate similar parts throughout the various views, there is seen a farrowing house, generally illustrated as 10, having slides 12, end walls 14 with a plurality of rail pivot apertures 16, and a roof 18. The sides 12 essentially define a truncated "A" in cross section. One end wall 14 has an opening 20 extending to grade and the other end wall 14 includes an opening 22 above grade for ventilation. A crib structure within the farrowing house 10 is defined by two sets of spaced rails, generally illustrated as 24, pivotally connected to end walls 14 and spaced upwardly from the grade and form a means for restricting movement of the sow to the central portion of the farrowing house 10 and the grade opening 20. Each set of rails 24 cooperates with its mating side wall 12 to provide an access area for farrows but precludes access to the sow whereby the farrows are free to nurse and the sow is prevented from lying inadvertently upon the farrows.

Each set of rails 24 has an end member 26 flushing against the face of end wall 14 and having at least two rail apertures 28. A first retaining means 30 (e.g. a bolt) is inserted through one of the rail apertures 28 and received by rail pivot aperture 16 to provide for pivotally swinging the rails 24 with respect to the end walls 14. A second retaining means 31 (e.g. a bolt) is inserted through the other of said rail apertures 28 and received by another of said rail pivot apertures 16 to preclude pivotation and stations the rails with respect to the end walls 14. End members 26 have integrally bound thereto an alignment member 32 which abuts a side wall 12 when the rail 24 is pivoted towards a contiguous side wall 12 to facilitate the aligning of a rail aperture 28 with a rail pivot aperture 16 in order that the second retaining means 31 can be inserted therethrough.

Figure 4:
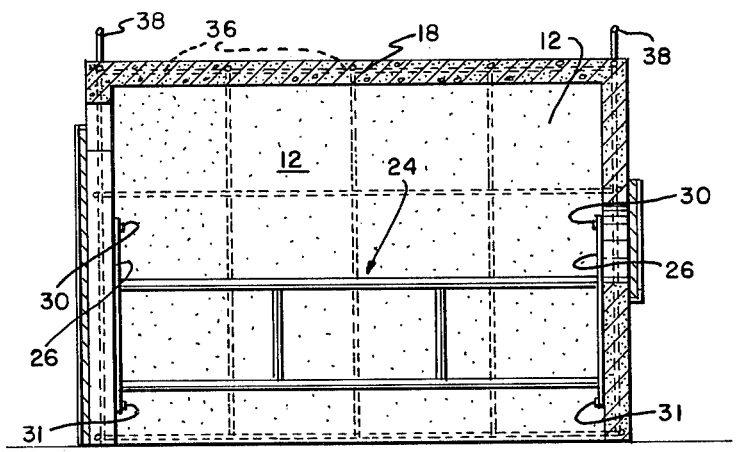
FIG. 4 is a vertical sectional view taken in directions of the plane of line 4—4 in FIG. 3.
Figure 5:
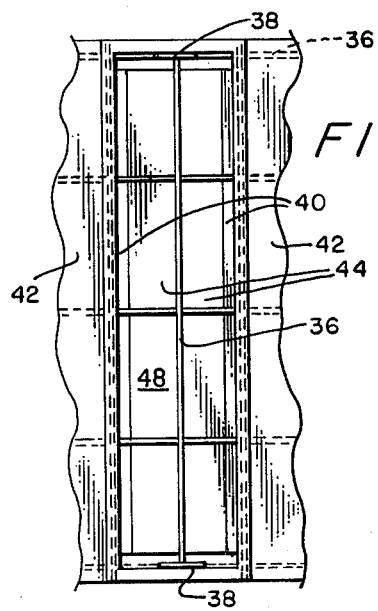
FIG. 5 is a partial top plan view of the outer shell imposed over the inner shell with the reinforcing cage therebetween.
Figure 6:
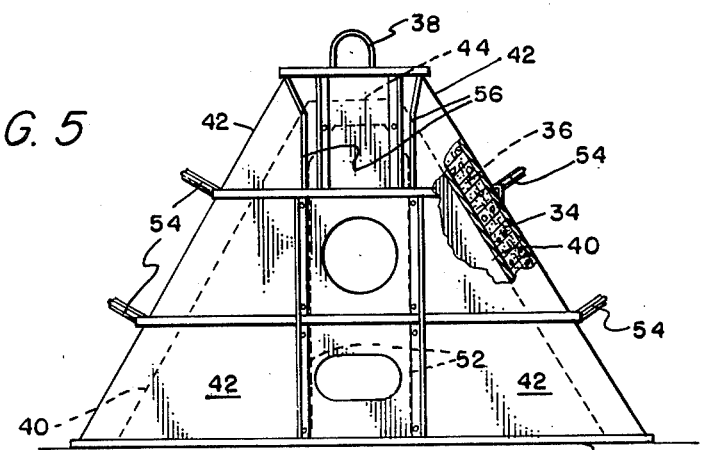
FIG. 6 is an end elevational view of the outer shell with the inner shell represented as dotted lines and the poured lightweight concrete in between the inner and outer shell.

The structure of the farrowing house 10 comprises a lightweight aggregate concrete 34 and a rebar cage reinforcement means 36 bound thereby (see FIGS. 4, 5, and 6). A protruding handle 38 attaches to cage 36 and portablizes the farrowing house 10. The lightweight concrete 34 is about one-half (½) the weight of normal concrete, and, in a preferred embodiment includes a batched density of between 60.0 lbs./cu. ft. and 80 lbs./cu. ft.; more preferably a batch density of 69.2 lbs./cu. ft. having about 25.0% weight of cement, 61.0% weight of gravel (e.g. ¾"×0.27 cu. ft.) and 14.0% water (e.g. 32 gallons). The batch weight of 34 after air drying is preferably about 1,300 lbs./cu. yd.

Figure 7:
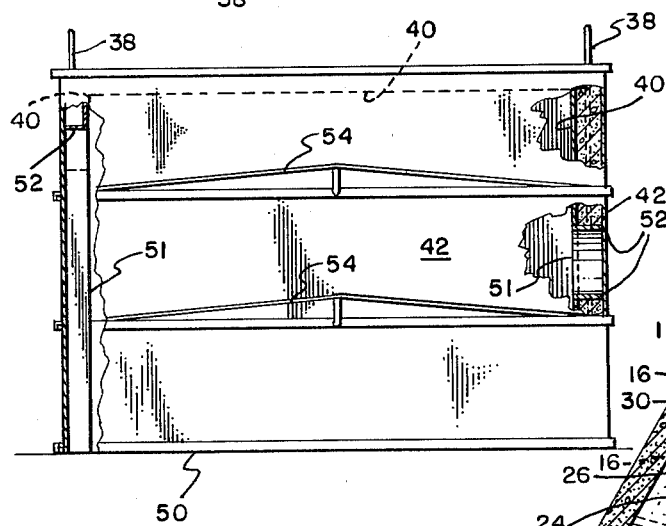
FIG. 7 is a side elevational view of the outer shell with the inner shell represented as dotted lines with the concrete and cage therebetween.
Figure 8:
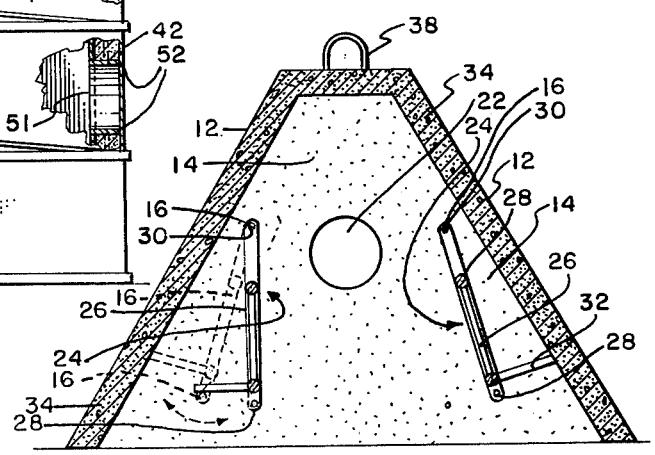
FIG. 8 is a vertical sectional view of the farrowing house disclosing the pivotal swinging rails including the alignment member attached thereto.

Another embodiment of the invention is a mold for casting the farrowing house 10, including an inner mold shell 40 and an external shell 42, each having opposed side walls and end walls, and each defining a truncated "A" in cross section. The shell 40 has a top wall 44, and the external shell 42 has an underneath opening 50 (see FIG. 6), an open top 48 (see FIG. 5), and is dimensioned and operable to receive the shell 40 so that an air gap exists between the shells 40 and 42, the air gap defining the wall thickness of the farrowing house 10. The inner mold shell 40 is formed with access openings 51 (see dotted lines in FIG. 7) circumscribed by outwardly projecting flanges 52 which are dimensioned to span the air gap and make contact with the mating end wall of the shell 42 and functionally form openings 20 and 22 of farrowing house 10. Access openings are not of necessity but projecting flanges 52 are necessary for openings 20 and 22. Shell 42 is formed with external stiffening rods 54 to preclude outward buckling. Lugs 56 are attached to the shell 42 to facilitate removing the shell 42 from the casted farrowing house 10. Cage 36 is disposed with the air gap spaced from shells 40 and 42.

With continuing reference to the drawings for the method of fabricating the farrowing house 10, inner shell 40 is constructed having opposed side walls, opposed end walls and a top wall, such as to define a truncated "A" in cross section. Cage 36 is constructed of metal in the same general configuration of the shell 40. The cage 36 is dimensioned such as to be spaced from the external surface of shell 40. Cage 36 is placed over the inner shell 40. Shell 42 is fabricated with open top 48 and is of the same general configuration as the inner shell 40. Shell 42 is dimensioned such as to receive the shell 40 and cage 36 in telescopic relation with the inner surface of the shell 42 spaced from the external surface of the inner shell 40 and with the cage 36 occupying the space between both shells 40 and 42. Shell 42 is placed over the cage 36, and subsequently, lightweight concrete (as has been previously described) is introduced into the space between shell 40 and 42 which is effective to mold a metal cage 36 reinforced farrowing house 10. A handle 38 may be attached to cage 36 prior to placing the cage 36 over the inner shell 40, the cage 36 being positioned midway between the outer surface of the inner shell 40 and the inner surface of the outer shell 42. Shell 40 may be formed with openings 51 and flanges 52 may be fabricated along the periphery of the openings 51 projecting outwardly from the end wall so that when shell 40 and shell 42 are arranged in telescopic relationship the flanges projecting from the openings 51 make contact with the internal surface of the mating end wall of the shell 42 whereby farrowing house 10 is molded with openings 20 and 22.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention.

I claim:

1. A farrowing house for an expectant sow comprising an enclosure having two side walls, two end walls having a structure defining a plurality of rail pivot apertures, and a roof, said side walls essentially defining a truncated "A" in cross section, one end wall having an opening to grade and the other end wall having an opening above grade for ventilation, a crib structure within said enclosure defining two sets of spaced rails having at least one set pivotally connected to said end walls, said sets of rails being spaced upwardly from the grade and forming a means for restricting movement of the sow to the central portion of said enclosure and to said grade opening, each set of rails cooperating with its mating side walls to provide an access area for farrows but precluding access to the sow whereby the farrows are free to nurse and the sow is prevented from lying inadvertently upon the farrows, each of said spaced rails includes a structure defining at least one end member flushing against the face of the end wall and having at least two rail apertures, a first retaining means inserted through one of said rail apertures and received by one of said rail pivot apertures to provide for pivotally swinging said rails with respect to said end walls, a second retaining means inserted through the other of said two rail apertures and received by another of said rail pivot apertures to preclude pivotation and station the rails with respect to said end wall, said at least one end member including an alignment means integrally bound to said at least one end member and abutting a side wall when said rail is pivoted towards a contiguous side wall to facilitate the aligning of a rail aperture with a rail pivot aperture in order that the second retaining means can be inserted therethrough.

2. The farrowing house of claim 1 wherein said enclosure comprises a rebar cage reinforcement means bound within a lightweight aggregate concrete means, a handle means attached to said rebar cage means and protruding from the farrowing house to portabilize the same.

* * * * *